May 6, 1969     D. E. GRAHAM     3,443,182
SYSTEM FOR OPERATING ALTERNATING CURRENT INDUCTION
TYPE MOTORS FROM A DIRECT CURRENT POTENTIAL SOURCE
Filed Sept. 20, 1966     Sheet 1 of 3

INVENTOR.
Donald E. Graham
BY Richard G. Stahl
ATTORNEY

INVENTOR.
Donald E. Graham
BY
Richard G. Stahl
ATTORNEY

United States Patent Office 3,443,182
Patented May 6, 1969

3,443,182
SYSTEM FOR OPERATING ALTERNATING CURRENT INDUCTION TYPE MOTORS FROM A DIRECT CURRENT POTENTIAL SOURCE
Donald E. Graham, Trotwood, Ohio, assignor to General Motors Corporation, Detroit, Mich., a corporation of Delaware
Filed Sept. 20, 1966, Ser. No. 580,822
Int. Cl. H02k 29/04
U.S. Cl. 318—138          7 Claims

ABSTRACT OF THE DISCLOSURE

A system or producing switching signals for triggering silicon controlled rectifier commutating switches conductive in the proper sequence to operate an alternating current induction motor from a direct current potential source. A potential level detector circuit adjusted to be responsive to a specific potential level to produce an output signal is provided for each silicon controlled rectifier commutating switch. The output circuit of a stepped potential level generator is applied to the input circuitry of all of the potential level detectors in parallel whereby successive trigger signals are produced with each successive step of the stepped potential level generator output wave form.

---

Figure 1:
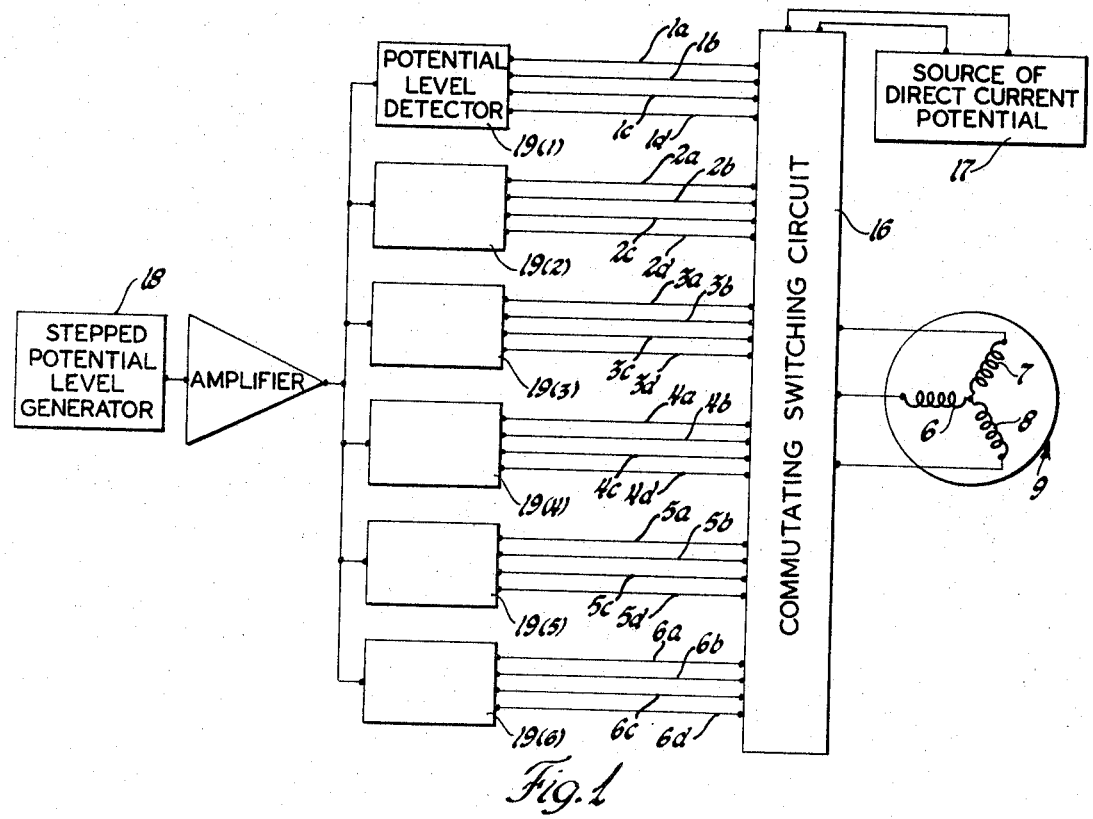

The present invention relates to a system for operating alternating current induction type motors from a direct current potential source and, more specifically, to an improved triggering system for producing the required commutating switch control signals.

Recently, there has been increased activity in the development of electrical motor propulsion systems. For this application, the most desirable electrical motor is one which produces a high torque under stall and low speed conditions and which is capable of operating at very high speeds. The high stall torque is characteristic of direct current motors while the high speed capability is generally attainable only in alternating current motors with neither brushes nor commutator. An ideal propulsion motor for high speed applications would be one which has the high speed capabilities of an alternating current motor without the commutator and brush limitations inherent in direct current motors. Therefore, a logical selection would be an alternating current induction type motor commutated as a direct current motor, but without commutator or brushes. That is, a brushless direct current commutated alternating current motor.

Armature or rotor rotation may be produced in an alternating current induction type motor energized from a direct current potential source by effectively rotating the magnetic poles produced by current flow through the stator coils which tend to pull the poles produced by current flow through the armature coils therealong. This essentially rotating magnetic field may be produced by energizing the stator windings of an alternating current induction type motor in the proper sequence from a direct current potential source.

Systems of this type usually employ an alternating current induction type motor, a solid state commutating switching circuit for commutating the alternating current motor as a direct current motor and a triggering system which produces the required commutating switch control signals. The commutating switching circuit performs the function normally accomplished by the commutator and brushes of a direct current motor in that this circuit energizes that stator windings of the alternating current motor in the proper sequence to produce the required essentially rotating magnetic field. Thus, the alternating current motor exhibits characteristics identical to those of direct current motors but, since the motor itself is an alternating current motor, its rotor may be designed to have the structural integrity which permits high speed operation.

It is, therefore, an object of this invention to provide an improved system for operating alternating current induction type motors from a direct current potential source.

It is another object of this invention to provide an improved triggering system for producing the commutating switch control signals required by a system for operating alternating current induction type motors from a direct current potential source.

It is a further object of this invention to provide an improved triggering system which produces, at various selectable frequencies for varying motor speed, the commutating switch control signals required by a system for operating alternating current induction type motors from a direct current potential source.

In accordance with this invention, an improved triggering system for producing the commutating switch control signals required by a system for operating alternating current induction type motors from a direct current potential source is provided wherein each commutating switch control signal is produced by a corresponding potential level circuit which is responsive to a corresponding potential level magnitude during each of a repeating series of stepped potential levels of increasing magnitude.

Figure 4:
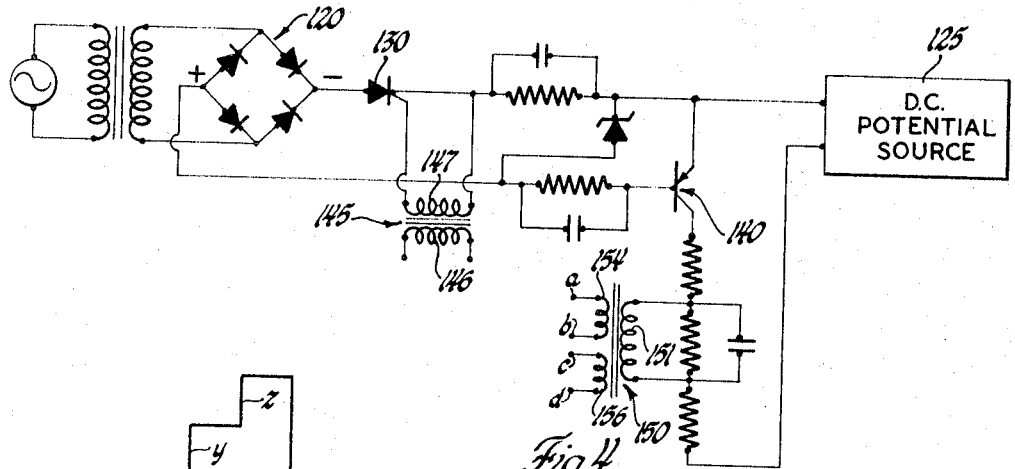
Figure 5:
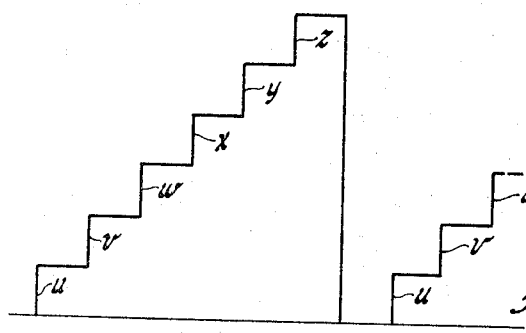
Figure 2:
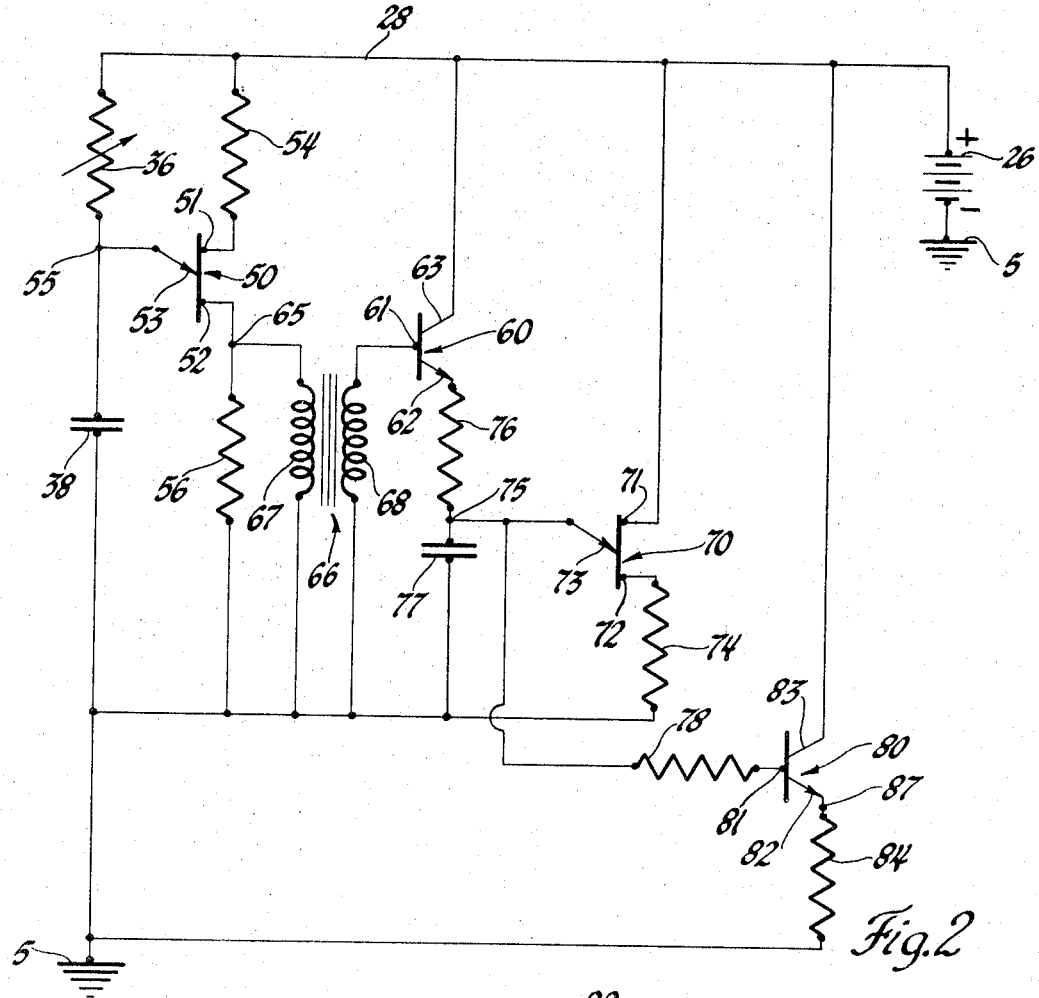
Figure 3:
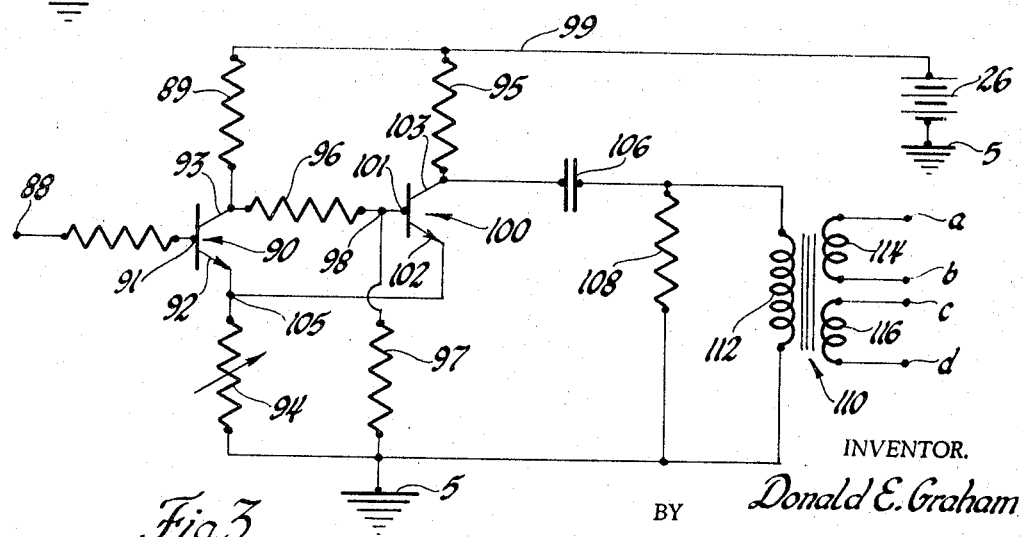
Figure 6:
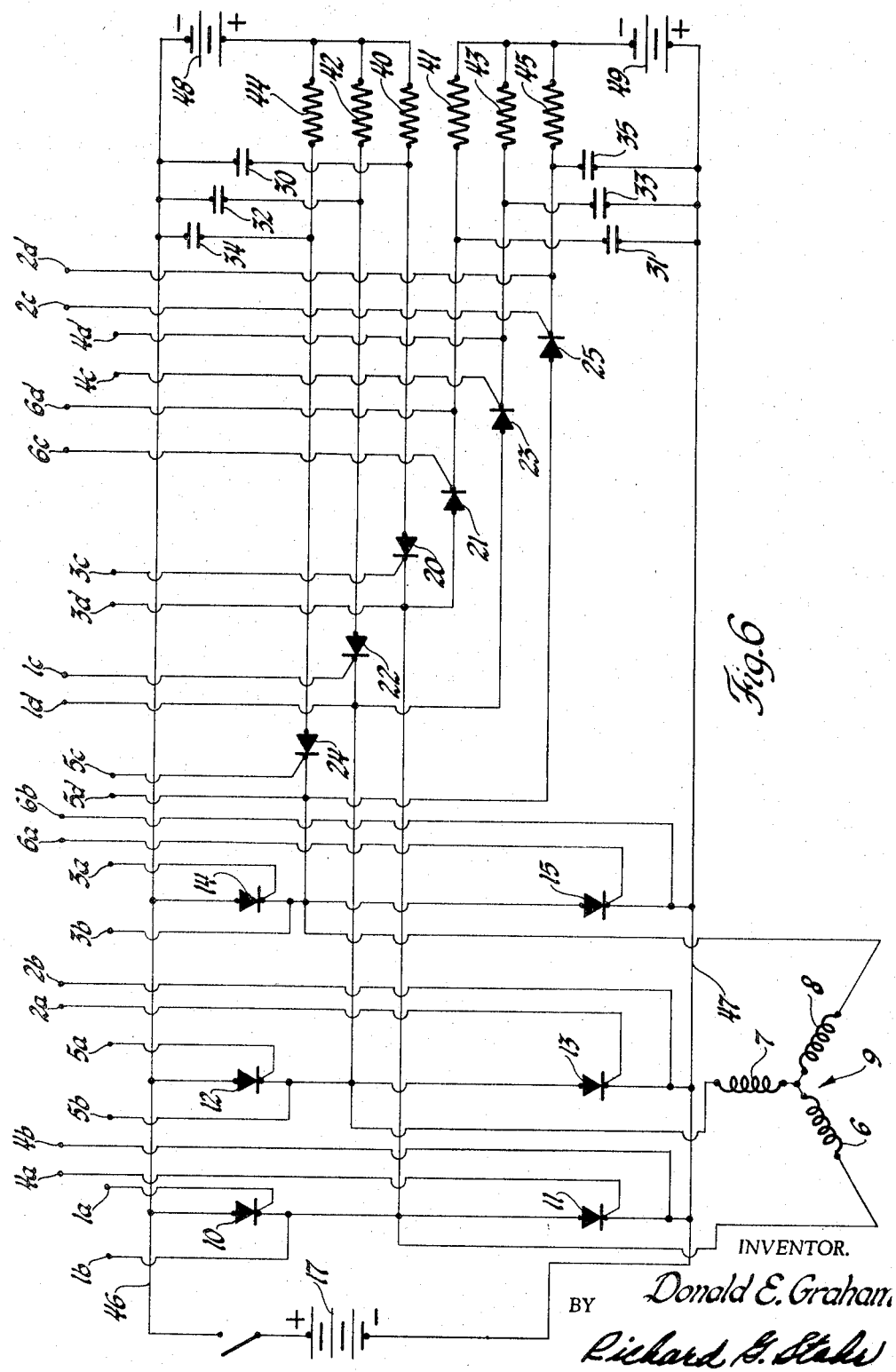

For a better understanding of the present invention, together with additional objects, advantages and features thereof, reference is made to the following description and accompanying drawings in which:

FIGURE 1 is a block diagram of a system for operating alternating current induction type motors from a direct current potential source, FIGURE 2 sets forth, in schematic form, circuit details of the stepped potential level generator shown in block form in FIGURE 1, FIGURE 3 sets forth, in schematic form, circuit details of the potential level detectors shown in block form in FIGURE 1, FIGURE 4 sets forth, in schematic form, circuit details of a fast rise pulse circuit which may be employed to amplify the output pulses of the potential level detectors, FIGURE 5 is a set of curves helpful in understanding the features of this invention and, FIGURE 6 sets forth, in schematic form, circuit details of the commutating switching circuit shown in block form in FIGURE 1.

Referring to the drawings, throughout the several figures of which like elements have been given like characters of reference, FIGURE 1 is a block diagram of a system for operating alternating current induction type motors from a direct current potential source.

The motor 9 may be any alternating current induction type motor, however, the features of this invention will be described in reference to a three phase, alternating current induction motor having "Y" connected stator coils 6, 7 and 8.

The commutating switching circuit 16, which performs the function of the commutator and brushes of a direct current motor, is schematically set forth in FIGURE 6 and will be explained in detail later in this specification.

To supply the required direct current power, a source of direct current potential 17 is shown to be connected to the commutating switching circuit. This source of direct current potential may be a conventional storage battery, as shown in FIGURE 6, or it may be any other source of direct current potential such as a source of rectified alternating current potential or a fuel cell combination.

The novel triggering system of this invention which produces the required commutating switch control signals includes the block 18 of FIGURE 1 entitled "stepped potential level generator" and the blocks 19(1) through 19(6) entitled "potential level detector." Examples of these circuits are schematically set forth in detail in FIGURES 2 and 3, respectively, and will be explained in detail later during this specification.

Without intention or inference of a limitation thereto, one example of a commutating switching circuit suitable for use with the triggering system of this invention is set forth in schematic form in FIGURE 6. To energize coils 6, 7 and 8 of motor 9 in the proper sequence to produce a rotating magnetic field, this commutating switching circuit includes a positive polarity bank of silicon controlled rectifier commutating switches, referenced by the numerals 10, 12 and 14, and a negative polarity bank of silicon controlled rectifier commutating switches, referenced by the numerals 11, 13 and 15, connected across positive and negative polarity input circuit lines 46 and 47, respectively.

The silicon controlled rectifier is a semiconductor device having a control electrode, generally termed the gate electrode, and two current carrying electrodes, generally referred to as the anode and cathode electrodes, which is designed to normally block current flow in either direction. With the anode and cathode electrodes forward poled, anode positive and cathode negative, the silicon controlled rectifier may be triggered conductive upon the application, to the control electrode, of a control potential signal of a polarity which is positive in respect to the potential present upon the cathode electrode and of sufficient magnitude to produce control electrode-cathode, or gate current. Upon being triggered conductive, however, the control electrode is no longer capable of affecting the device, which will remain in the conductive state until either the anode-cathode circuit is interrupted or the polarity of the potential applied across the anode-cathode electrodes is reversed. Of these two alternatives, the reversal of the polarity of the potential across the anode-cathode electrodes is perhaps the most satisfactory.

In the commutating switching circuit of FIGURE 6, the reverse polarity potential is supplied by discharging a capacitor in a reverse polarity relationship across the anode-cathode electrodes of the corresponding silicon controlled rectifier commutating switch. Therefore, capacitors 30, 31, 32, 33, 34 and 35, corresponding to respective silicon controlled rectifier commutating switches 10, 11, 12, 13, 14 and 15, are provided.

Capacitors 30, 32 and 34 are charged from a source of direct current potential, which may be a battery 48, through respective charging resistors 40, 42 and 44. Capacitors 31, 33 and 35 are charged from a source of direct current potential, which may be a battery 49, through respective charging resistors 41, 43 and 45.

So that each silicon controlled rectifier commutating switch may be selectively extinguished by the application of the electrical charge stored in the corresponding capacitor in a reverse polarity relationship across the anode-cathode electrodes thereof, provision is made for establishing a discharge circuit for each capacitor across the anode-cathode electrodes of the corresponding silicon controlled rectifier commutating switch through a corresponding controllable extinguishing switching device, shown in the drawing as silicon controlled rectifier extinguishing switches 20, 21, 22, 23, 24 and 25 corresponding to respective silicon controlled rectifier commutating switches 10, 11, 12, 13, 14 and 15.

The commutating switching circuit set forth in FIGURE 6 is described in detail in a copending application Ser. No. 494,743, filed Oct. 11, 1965 and assigned to the same assignee as the present application, therefore, this description of the commutating switching circuit has been brief.

It is to be specifically understood, however, that the novel triggering system of this invention is suitable for use with any commutating switching circuit which employs commutating switching devices of the type which may be triggered conductive upon the application thereto of a control signal.

With the novel triggering system of this invention, a potential level sensitive circuit corresponding to each of the commutating switching devices included in the commutating switching circuit produces a corresponding commutating switch control signal in response to a corresponding potential level magnitude during each of a repeating series of stepped potential levels of increasing magnitude.

To produce the repeating series of stepped potential levels of increasing magnitude, a stepped potential wave form generator may be employed. Without intention or inference of a limitation thereto, one example of a circuit of this type is a unijunction transistor relaxation oscillator type stepped potential wave form generator as schematically set forth in FIGURE 2, may be employed. This stepped potential wave form generator comprises a source of direct current potential which may be a battery 26 or any other suitable direct current potential source, a unijunction transistor relaxation oscillator which includes unijunction transistor 50, having the usual base electrodes 51 and 52 and an emitter electrode 53, and the associated circuitry including variable resistor 36, capacitor 38 and resistors 54 and 56 connected in a relaxation oscillator configuration, a capacitor 77 and a circuit responsive to each output signal pulse of the relaxation oscillator circuit for placing a series of electrical charges of increasing magnitude upon capacitor 77 from source of direct current potential 26.

The series combination of variable resistor 36 and capacitor 38 and the series combination of resistor 54, base electrode 51 and base electrode 52 of unijunction transistor 50 and resistor 56 are connected in parallel across source of direct current potential 26 through lead 28 and point of reference or ground potential 5 and the emitter electrode 53 of unijunction transistor 50 is connected to junction 55 between variable resistor 36 and capacitor 38. Connected in this configuration, these elements comprise a unijunction transistor relaxation oscillator circuit.

The circuitry responsive to each output signal pulse of the relaxation oscillator circuit for placing a series of electrical charge of increasing magnitude upon capacitor 77 from source of direct current potential 26 comprises a type NPN transistor 60 having the usual base 61, emitter 62 and collector 63 electrodes and a pulse transformer 66 having a primary winding 67 and a secondary winding 68. Primary winding 67 of pulse transformer 66 is connected across resistor 56 of the relaxation oscillator circuit between junction 65 and point of reference or ground potential 5 and the secondary winding 68 of pulse transformer 66 is connected between the base electrode 61 of transistor 60 and point of reference or ground potential 5. The collector electrode 63 and emitter electrode 62 of transistor 60 are connected in series with a current limiting resistor 76 and capacitor 77 across source of direct current potential 26 through lead 28 and point of reference or ground potential 5. As the collector electrode 63 of transistor 60 is connected to the positive polarity terminal of direct current potential source 26 through lead 28 and the emitter electrode 62 of transistor 60 is connected to the negative polarity terminal of direct current potential source 26 through current limiting resistor 76, capacitor 77 and point of reference or ground potential 5, this type NPN transistor is forward poled.

The unijunction transistor is a semiconductor device which is characterized by a high emitter to negative polarity base resistance with an applied emitter potential of a magnitude less than the peak point voltage of the device. With an applied emitter potential of a magnitude equal to or greater than the peak point voltage, the unijunction transistor switches to a low resistance state and conducts current readily between the emitter electrode and the negative polarity base electrode. After being triggered to conduction, the unijunction transistor spontaneously extinguishes itself when the potential applied to the emitter electrode is reduced to some magnitude less than the peak point voltage.

Upon the application of a direct current potential across positive polarity line 28 and point of reference or ground potential 5, capacitor 38 begins to charge through variable resistor 36. When the charge upon capacitor 38 reaches a magnitude substantially equal to the peak point voltage of unijunction transistor 50, this device switches to its low resistance state and capacitor 38 discharges through the emitter 53 and base 52 electrodes and resistor 56. When the charge upon capacitor 38 has reduced to a magnitude less than the peak point voltage of unijunction transistor 50, this device spontaneously returns to its high resistance state. With unijunction transistor 50 in the high resistance state, capacitor 38 again begins to charge through variable resistor 36 and the cycle just described repeats until the direct current potential is removed from the circuit. Upon each discharge of capacitor 38 through resistor 56, a potential pulse appears thereacross which may be applied to external circuitry connected across junction 65 and point of ground potential 5.

The output signal pulses appearing across resistor 56 are coupled to the base electrode 61 of transistor 62 through pulse transformer 66. The primary winding 67 and secondary winding 68 of pulse transformer 66 are so poled that, with the end of primary winding 67 connected to junction 65 of a positive polarity, the end of secondary winding 68 connected to base electrode 61 of transistor 60 is also of a positive polarity. To produce base-emitter current flow through a type NPN transistor, it is necessary that the potential upon the base electrode thereof be of a polarity positive with respect to the potential upon the emitter electrode thereof. As secondary winding 68 of pulse transformer 66 is connected across the base-emitter electrodes of type NPN transistor 60, this device is triggered conductive during each of the output signal pulses appearing across resistor 56 of the relaxation oscillator circuit.

With each period of conduction of transistor 60, capacitor 77 receives a charge from source of direct current potential 26. Therefore, as transistor 60 conducts in response to each output signal pulse of the relaxation oscillator circuit, a series of electrical charges of increasing magnitude is placed upon capacitor 77 from source of direct current potential 26 and the potential across capacitor 77 appears as a stepped potential wave form as shown in FIGURE 5. The potential across capacitor 77 is of a positive polarity upon junction 75 in respect to point of reference or ground potential 5 and may be applied to external circuitry connected across junction 75 and point of reference or ground potential 5.

To discharge capacitor 77 at the conclusion of each series of stepped potential levels, a unijunction transistor 70 having the usual base electrodes 71 and 72 and emitter electrode 73 may be employed. Base electrodes 71 and 72 of unijunction transistor 70 are connected across source of direct current potential 26 through lead 28, resistor 74 and point of reference or ground potential 5 and the emitter electrode 73 is connected to junction 75 between resistor 76 and capacitor 77. Unijunction transistor 70 is selected to have a peak point voltage of a magnitude substantially equal to the maximum cumulative potential of the stepped potential levels appearing across capacitor 77. Therefore, at the conclusion of each series of stepped potential levels when the maximum voltage across capacitor 77 is substantially equal to the peak point voltage of unijunction transistor 70, this device switches to its low resistance state and capacitor 77 discharges through the emitter electrode 73, base electrode 72 and resistor 74. After capacitor 77 has discharged, it is conditioned to receive the next series of step charges with each output signal pulse appearing across resistor 56 of the relaxation oscillator circuit.

The frequency of the series of output signal pulses appearing across resistor 56 of the relaxation oscillator circuit and, hence, the repetition rate of the series of stepped potential levels appearing across capacitor 77 may be varied by varying variable resistor 36. The rate at which capacitor 38 charges is determined, to a large extent, by the ohmic value of resistor 36. Therefore, as the value of this resistance is reduced, capacitor 38 more quickly charges to the peak point voltage of unijunction transistor 50, a condition which increases the frequency of the output signal pulses appearing across resistor 56. As transistor 60 is responsive to each of these output signal pulses to place a charge upon capacitor 77, the repetition rate of the series of stepped potential levels is also increased.

To preserve each incremental charge upon capacitor 77 and to provide at least some degree of amplification of the potential appearing across capacitor 77, a type NPN transistor 80 having the usual base 81, emitter 82 and collector 83 electrodes connected in an emitter follower configuration having a high input impedance may be employed. As the collector electrode 83 of type NPN transistor is connected to the positive polarity terminal of direct current potential source 26 through lead 28 and the emitter electrode 82 is connected to the negative polarity terminal of direct current potential source 26 through resistor 84 and point of reference or ground potential 5, this device is forward poled. The base electrode 81 and emitter electrode 82 are connected respectively to junction 75 and point of reference or ground potential 5 through respective resistors 78 and 84. As the potential upon junction 75 is of a positive polarity in respect to point of reference or ground potential 5, the charge upon capacitor 77 is of the proper polarity to produce base-emitter current flow through type NPN transistor 80 to a degree proportional to the magnitude of the charge upon capacitor 77. The output of transistor 80 may be applied to external circuitry connected across junction 87 and point of reference or ground potential 5.

The potential level sensitive circuit corresponding to each commutating switch of the commutating switching circuit for producing a commutating switch control signal in response to a corresponding potential level magnitude during each series of stepped potential levels may be a conventional Schmitt trigger circuit as schematically set forth in FIGURE 3. It is to be specifically understood that alternate electrical circuits having similar electrical characteristics may be substituted for these Schmitt trigger circuits without departing from the spirit of the invention.

Connected in parallel across source of direct current potential 26, which may be a battery or any other suitable direct current potential source, is the series combination of resistor 89, collector electrode 93 of type NPN transistor 90, emitter electrode 92 of type NPN transistor 90 and variable resistor 94 and the series combination of resistor 95, collector electrode 103 of type NPN transistor 100, emitter electrode 102 of type NPN transistor 100 and variable resistor 94 through positive polarity lead 99 and point of reference or ground potential 5. Therefore, these two type NPN transistors are forward poled.

Upon the application of potential across positive polarity lead 99 and point of reference or ground potential 5, current flows through resistor 89, resistor 96 and resistor 97. The potential drop across resistor 97 produced by this current flow is of a positive polarity at junction 98, a condition which produces base-emitter current flow through a type NPN transistor, therefore, transistor 100 is normally conducting with the circuit in the initial stable state. With transistor 100 conducting, the collector-emitter current flow therethrough also flows through common emitter resistor 94 and the potential drop across resistor 94 is of a positive polarity at junction 105, a condition which tends to reverse emitter bias type NPN transistor 90, thereby maintaining this device in a cutoff condition. Upon the application of a positive polarity potential to the base 91 of transistor 90, this reverse emitter bias may be overcome to produce base-emitter current flow through type NPN transistor 90, thereby triggering this device to conduction. As transistor 90 conducts, the potential across the base 101 and emitter 102 of transistor 100 is substantially zero, therefore, transistor 100 extinguishes and remains in a cutoff condition as long as transistor 90 is conducting and the circuit is in the alternate state. When the potential is removed from the base 91 of transistor 90, base drive current is removed therefrom and this device returns to the nonconducting state. Current flow through resistor 97 again triggers type NPN transistor 100 to conduction and the circuit has returned to the initial stable state.

Each time transistor 100 is triggered nonconductive upon the application of a positive polarity signal to the base electrode 91 of transistor 90 of a magnitude sufficient to overcome the reverse emitter bias appearing at junction 105, capacitor 106 charges through resistor 95 and the parallel combination of resistor 108 and the primary winding 112 of pulse transformer 110. This pulse of charging current through primary winding 112 induces a commutating switch control signal either in secondary winding 114 or 116 and an extinguishing switch control signal in the other secondary winding. For purposes of this specification, it will be assumed that the commutating switch control signal is induced in secondary winding 114 and the extinguishing switch control signal is induced in secondary winding 116.

A Schmitt trigger circuit, as set forth in FIGURE 3, corresponding to each commutating switching device of the commutating switching circuit of FIGURE 6 is provided. The input circuits of all of these trigger circuits are connected in parallel across junction 87 and point of reference or ground potential 5 through the input terminals correspond to input terminal 88 of FIGURE 3.

The magnitude of positive polarity potential required to be applied to the terminal corresponding to input terminal 88 of FIGURE 3 to overcome the reverse emitter bias present upon the junction corresponding to junction 105 to trigger each of these circuits to the alternate state may be selected by adjusting variable emitter resistor 94. Therefore, the variable emitter resistors corresponding to variable emitter resistor 94 of FIGURE 3 of potential level detectors 19(1) through 19(6), inclusive, of FIGURE 1 are adjusted to provide for the triggering of one of the Schmitt trigger circuits at each of potential levels $u$, $v$, $w$, $x$, $y$ and $z$ of the stepped potential wave form of FIGURE 5. Therefore, one of potential level detectors 19(1) through 19(6) is triggered to the alternate state with each step of the stepped poential wave form produced by the circuitry of FIGURE 2.

To apply the commutating switch control signal appearing across the primary winding 114 of pulse transformer 110 of each of the potential level detectors across the control electrode and one of the current carrying electrodes of the corresponding commutating switching device of FIGURE 6, terminal $a$ is connected to the control electrode and terminal $b$ is connected to the cathode electrode of the corresponding silicon controlled rectifier commutating switch. These connections are labeled in FIGURE 1 and FIGURE 6. Terminals $c$ and $d$ of each of secondary windings 116 are connected across the control-cathode electrodes of the corresponding silicon controlled rectifier extinguishing switch of FIGURE 6.

In FIGURES 1 and 6, the terminals corresponding to terminals $a$ and $b$ of secondary winding 114 and $c$ and $d$ of secondary winding 116 of FIGURE 3 have been prefixed by the number of the corresponding potential level detector. That is, these terminals have been prefixed by the numeral 1 for potential level detector 19(1) and with the numeral 2 for potential level detector 19(2), etc.

In the following description of the operation of the triggering system of this invention, the various potential levels are referenced to FIGURE 5.

At potential level $u$, potential level detector 19(1) is triggered to the alternate state which produces a commutating switch control signal across terminals 1$a$ and 1$b$ and an extinguishing switch control signal across terminals 1$c$ and 1$d$ thereof. As terminals 1$a$ and 1$b$ and 1$c$ and 1$d$ of potential level detector 19(1) are connected to the control-cathode electrodes, respectively, of silicon controlled rectifier commutating switch 10 and silicon controlled rectifier extinguishing switch 22, respectively, these devices are triggered to conduction.

At potential level $v$, potential level detector 19(2) is triggered to the alternate state which produces a commutating switch control signal across terminals 2$a$ and 2$b$ and an extinguishing switch control signal across terminals 2$c$ and 2$d$ thereof. As terminals 2$a$ and 2$b$ and 2$c$ and 2$d$ of potential level detector 19(2) are connected to the control-cathode electrodes, respectively, of silicon controlled rectifier commutating switch 13 and silicon controlled rectifier extinguishing switch 25, respectively, these devices are triggered to conduction. With silicon controlled rectifier commutating switches 10 and 13 conducting, an energizing circuit for stator coils 6 and 7 of motor 9 is completed therethrough across source of direct current potential 17 and motor 9 begins to rotate.

At potential level $w$, potential level detector 19(3) is triggered to the alternate state which produces a commutating switch control signal across terminals 3$a$ and 3$b$ and an extinguishing switch control signal across terminals 3$c$ and 3$d$ thereof. As terminals 3$a$ and 3$b$ and 3$c$ and 3$d$ of potential level detector 19(3) are connected to the control-cathode electrodes, respectively, of silicon controlled rectifier commutating switch 14 and silicon controlled rectifier extinguishing switch 20, respectively, these devices are triggered to conduction. With silicon controlled rectifier commutating switch 14 conducting, an energizing circuit for stator coils 8 and 7 of motor 9 is completed across source of direct current potential 17 through conducting silicon controlled rectifier commutating switches 14 and 13. With silicon controlled rectifier extinguishing switch 20 conducting, a circuit is completed for applying the charge upon capacitor 30 across the anode-cathode electrodes of silicon controlled rectifier commutating switch 10, thereby extinguishing this device.

At potential level $x$, potential level detector 19(4) is triggered to the alternate state which produces a commutating switch control signal across terminals 4$a$ and 4$b$ and an extinguishing switch control signal across terminals 4$c$ and 4$d$ thereof. As terminals 4$a$ and 4$b$ and 4$c$ and 4$d$ of potential level detector 19(4) are connected to the control-cathode electrodes, respectively, of silicon controlled rectifier commutating switch 11 and silicon controlled rectifier extinguishing switch 23, respectively, these devices are triggered to conduction. With silicon controlled rectifier commutating switch 11 conducting, an energizing circuit for stator coils 8 and 6 of motor 9 is completed across source of direct current potential 17 through conducting silicon controlled rectifier commutating switches 14 and 11. With silicon controlled rectifier extinguishing switch 23 conducting, a circuit is completed for applying the charge upon capacitor 33 across the anode-cathode electrodes of silicon controlled rectifier commutating switch 13, thereby extinguishing this device.

At potential level $y$, potential level detector 19(5) is triggered to the alternate state which produces a commutating switch control signal across terminals 5$a$ and 5$b$ and an extinguishing switch control signal across terminals 5$c$ and 5$d$ thereof. As terminals 5$a$ and 5$b$ and 5$c$ and 5$d$ of potential level detector 19(5) are connected to the control-cathode electrodes, respectively, of silicon controlled rectifier commutating switch 12 and silicon controlled rectifier extinguishing switch 24, respectively, these devices are triggered to conduction. With silicon controlled rectifier commutating switch 12 conducting, an energizing circuit for stator coils 7 and 6 of motor 9 is completed across source of direct current potential 17 through conducting silicon controlled rectifier commutating switches 12 and 11. With silicon controlled rectifier extinguishing switch 24 conducting, a circuit is completed for applying the charge upon capacitor 34 across the anode-cathode electrodes of silicon controlled rectifier commutating switch 14, thereby extinguishing this device.

At potential level z, potential level detector 19(6) is triggered to the alternate state which produces a commutating switch control signal across terminals 6a and 6b and an extinguishing switch control signal across terminals 6c and 6d thereof. As terminals 6a and 6b and 6c and 6d of potential level detector 19(6) are connected to the control-cathode electrodes, respectively, of silicon controlled rectifier commutating switch 15 and silicon controlled rectifier extingishing switch 21, respectively, these devices are triggered to conduction. With silicon controlled rectifier commutating switch 15 conducting, an energizing circuit for stator coils 7 and 8 of motor 9 is completed across source of direct current potential 17 through conducting silicon controlled rectifier commutating switches 12 and 15. With silicon controlled rectifier extinguishing switch 21 conducting, a circuit is completed for applying the charge upon capacitor 31 across the anode-cathode electrodes of silicon controlled rectifier commutating switch 11, thereby extinguishing this device.

Substantially at potential level z, the cumulative potential appearing across capacitor 77 is substantially equal to the peak point voltage of unijunction transistor 70 of FIGURE 2. Therefore, at this time, this device switches to its low resistance state and capacitor 77 discharges through the emitter electrode 73, base electrode 72 and resistor 74 and is in a condition to receive the next series of charges with each output signal pulse appearing across resistor 56 of the relaxation oscillator circuit and the next stepped potential wave form of the series begins.

At potential level u of the next of the series of stepped potential levels, potential level detector 19(1) is triggered to the alternate state which produces a commutating switch control signal across terminals 1a and 1b and an extinguishing switch control signal across terminals 1c and 1d thereof. As terminals 1a and 1b and 1c and 1d of potential level detector 19(1) are connected to the control-cathode electrodes, respectively, of silicon controlled rectifier commutating switch 10 and silicon controlled rectifier extinguishing switch 22, respectively, these devices are triggered to conduction. With silicon controlled rectifier commutating switch 10 conducting, an energizing circuit for stator coils 6 and 8 of motor 9 is completed across source of direct current potential 17 through conducting silicon controlled rectifier commutating switches 10 and 15. With silicon controlled rectifier extinguishing switch 22 conducting, a circuit is completed for applying the charge upon capacitor 32 across the anode-cathode electrodes of silicon controlled rectifier commutating switch 12, thereby extinguishing this device.

At potential level v of the next of the series of stepped potential levels, potential level detector 19(2) is triggered to the alternate state which produces a commutating switch control signal across terminals 2a and 2b and an extinguishing switch control signal across terminals 2c and 2d thereof. As terminals 2a and 2b and 2c and 2d of potential level detector 19(2) are connected to the control-cathode electrodes, respectively, of silicon controlled rectifier commutating switch 13 and silicon controlled rectifier extinguishing switch 25, respectively, these devices are triggered to conduction. With silicon controlled rectifier commutating switch 13 conducting, an energizing circuit for stator coils 6 and 7 of motor 9 is completed across source of direct current potential 17 through conducting silicon controlled rectifier commutating switches 10 and 13. With silicon controlled rectifier extinguishing switch 25 conducting, a circuit is completed for applying the charge upon capacitor 35 across the anode-cathode electrodes of silicon controlled rectifier commutating switch 15, thereby extinguishing this device.

At potential level w of the next of the series of stepped potential levels, potential level detector 19(3) is triggered to the alternate state which produces a commutating switch control signal across terminals 3a and 3b and an extinguishing switch control signal across terminals 3c and 3d thereof. As terminals 3a and 3b and 3c and 3d of potential level detector 19(3) are connected to the control-cathode electrodes, respectively, of silicon controlled rectifier commutating switch 14 and silicon controlled rectifier extinguishing switch 20, respectively, these devices are triggered to conduction. With silicon controlled rectifier commutating switch 14 conducting, an energizing circuit for stator coils 8 and 7 of motor 9 is completed across source of direct current potential 17 through conducting silicon controlled rectifier commutating switches 14 and 13. With silicon controlled rectifier extinguishing switch 20 conducting, a circuit is completed for applying the charge upon capacitor 30 across the anode-cathode electrodes of silicon controlled rectifier commutating switch 10, thereby extinguishing this device.

From the foregoing description, it is apparent that stator coil pairs of motor 9 are energized from source of direct current potential 17 in a sequence which will produce an essentially rotating magnetic field. As rotor speed is dependent upon the speed at which this essentially rotating magnetic field appears to rotate, and since the speed of apparent rotation is determined by the switching sequence speed of the commutating switching circuit, motor speed may be varied by varying the repetition rate of the series of stepped potential levels of increasing magnitude from which the commutating switch control signals are derived. Therefore, motor speed may be varied by adjusting variable resistor 36 of FIGURE 2 which increases or decreases the repetition rate of the series of stepped potential levels in a manner previously described.

In the preceding description, potential level detectors 19(1) through 19(6) were described as being triggered to the alternate state in succession. It is to be specifically understood that these potential level detector circuits need not be triggered to the alternate state in succession so long as the commutating switch control signals and extinguishing switch control signals are applied to the switching devices of the commutating switching circuit of FIGURE 6 in the proper sequence to produce a substantially rotating magnetic field.

With some applications, particularly with motors of high horsepower rating, it may be necessary to produce a fast rise pulse to trigger the silicon controlled rectifier commutating and extinguishing switches. In this event, a circuit for producing the required fast rise trigger pulse is required for each switching device of FIGURE 6. A suitable circuit for this application is schematically set forth in FIGURE 4. This circuit includes a source of direct current potential 120, which may be a rectified source of alternating current, and a second source of direct current potential 125, which may be any conventional direct current potential source, a pilot silicon controlled rectifier 130 and a type PNP transistor 140 having the usual base, emitter and collector electrodes. Pilot silicon controlled rectifier 130 and type PNP switching transistor 140 are normally nonconductive. The control signal pulses appearing in secondary windings 114 and 116 of FIGURE 3 may be transformer coupled to the control-cathode electrodes of pilot silicon controlled rectifier 130 through a pulse coupling transformer 145 having a primary winding 146 and a secondary winding 147. The primary winding corresponding to primary winding 146 of each of these circuits may be connected across the output terminals of the secondary windings corresponding to secondary windings 114 and 116 of FIGURE 3. With each control signal pulse, pilot silicon controlled rectifier is triggered conductive to complete a circuit to supply emitter-base current through type PNP transistor 140, thereby triggering this device to conduction. As transistor 140 conducts, an energizing circuit across direct current potential source 125 for primary winding 151 of pulse transformer 150 is completed. The resulting flow of current induces a commutating switch control signal in secondary winding 154 and an extinguishing switch control signal in secondary winding 156. The terminals of secondary windings 154 and 156 have been labeled by the same letter designation as in FIGURE 3 and, therefore, may be connected as shown in FIGURES 1 and 6.

As this fast rise pulse circuit is described in detail in my copending application Ser. No. 580,708, filed Sept. 20, 1966 and assigned to the same assignee of the present invention, this description has been brief.

Throughout this specification, specific devices, electrical circuits and electrical polarities have been set forth. It is to be specifically understood that alternate devices and electrical circuits having similar electrical characteristics and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. In a system for operating alternating current induction type motors from a direct current potential source including a commutating switching circuit having a plurality of commutating switching devices of the type which may be triggered conductive upon the application of a control signal thereto, the triggering system for producing the required commutating switch control signals comprising, means for producing a repeating series of stepped potential levels of increasing magnitude, a potential level sensitive means corresponding to each of said commutating switching devices for producing a commutating switch control signal in response to a corresponding potential level magnitude during each of said series of stepped potential levels and means for applying the said commutating switch control signal produced by each of said potential level sensitive means to the corresponding said commutating switching device.

2. In a system for operating alternating current induction type motors from a direct current potential source, the triggering system for producing the required commutating switch control signals as defined in claim 1 which further includes a means for varying the repetition rate of said series of stepped potential levels for varying motor speed.

3. In a system for operating alternating current induction type motors from a direct current potential source, the triggering system for producing the required commutating switch control signals as defined in claim 1 wherein said means for producing a repeating series of stepped potential levels of increasing magnitude is a stepped potential wave form generator.

4. In a system for operating alternating current induction type motors from a direct current potential source, the triggering system for producing the required commutating switch control signals as defined in claim 1 wherein said potential level sensitive means are Schmitt trigger circuits.

5. In a system for operating alternating current induction type motors from a direct current potential source, the triggering system for producing the required commutating switch control signals as defined in claim 1 wherein said means for producing a repeating series of stepped potential levels of increasing magnitude comprises, a source of direct current potential, a unijunction transistor relaxation oscillator circuit, means for connecting said relaxation oscillator circuit across said source of direct current potential, a capacitor and means responsive to each output signal pulse of said relaxation oscillator circuit for placing a series of electrical charges of increasing magnitude upon said capacitor from said source of direct current potential.

6. In a system for operating alternating current induction type motors from a direct current potential source, the triggering system for producing the required commutating switch control signals as defined in claim 5 which further includes a second unijunction transistor having two base electrodes and an emitter electrode, means for connecting said base electrodes across said source of direct current potential and means for connecting said emitter electrode and one of said base electrodes in parallel with said capacitor for discharging said capacitor at the conclusion of each series of said stepped potential levels.

7. In a system for operating alternating current induction type motors from a direct current potential source, the triggering system for producing the required commutating switch control signals as defined in claim 1 which further includes a circuit for producing a fast rise pulse connected between each of said potential level sensitive means and the corresponding said commutating switching device.

References Cited

UNITED STATES PATENTS

| | | | |
|---|---|---|---|
| 3,247,433 | 4/1966 | Lasch et al. | 318—138 |
| 3,307,091 | 2/1967 | Johannes | 318—138 |

ORIS L. RADER, *Primary Examiner.*

G. SIMMONS, *Assistant Examiner.*

U.S. Cl. X.R.

318—216, 227, 231